United States Patent
Gardner et al.

(10) Patent No.: US 8,403,447 B1
(45) Date of Patent: Mar. 26, 2013

(54) FLUID JETTING WITH DELAYS

(75) Inventors: Deane A. Gardner, Cupertino, CA (US); Yulin Philip Hseuh, El Dorado Hills, CA (US)

(73) Assignee: FUJIFILM Dimatix, Inc., Lebanon, NH (US)

( * ) Notice: Subject to any disclaimer, the term of this patent is extended or adjusted under 35 U.S.C. 154(b) by 48 days.

(21) Appl. No.: 13/231,599

(22) Filed: Sep. 13, 2011

(51) Int. Cl.
*B41J 29/38* (2006.01)

(52) U.S. Cl. .................. 347/14; 347/9; 347/12; 347/13

(58) Field of Classification Search ........... 347/9, 12–14
See application file for complete search history.

(56) References Cited

U.S. PATENT DOCUMENTS

| | | | |
|---|---|---|---|
| 4,393,386 A * | 7/1983 | Di Giulio | 347/5 |
| 6,913,337 B2 * | 7/2005 | Kuronuma et al. | 347/9 |
| 7,722,147 B2 | 5/2010 | Gardner | |

* cited by examiner

*Primary Examiner* — Julian Huffman
(74) *Attorney, Agent, or Firm* — Fish & Richardson P.C.

(57) ABSTRACT

Among other things, the disclosure features a system for use in fluid jetting. The system comprises a first print module comprising a first row of nozzles, a second print module comprising a second row of nozzles, and a controller to receive a first data packet from a remote device at a first moment and a second data packet from the remote device at a second moment after the first moment. Upon receipt of the first data packet, the controller is configured to cause at least some nozzles in the first row, at a third moment, to eject fluid droplets onto a line on a substrate. Upon receipt of the second data packet, the controller is configured to cause at least some nozzles in the second row, at a fourth moment separated from the third moment by a time delay, to eject fluid droplets onto the line on the substrate.

17 Claims, 9 Drawing Sheets

FLUID JETTING WITH DELAYS

TECHNICAL FIELD

This disclosure generally relates to fluid jetting with delays.

BACKGROUND

When an image such as a picture or a page of text is to be printed, image data generally is translated by a computer system from one format into another format understandable by a printer and then relayed to a print buffer associated with the printer. The print buffer receives the translated image data and stores at least a portion of the image data for subsequent printing by the printer.

Many printers include multiple discrete print modules each having one or more rows of inkjet nozzles to eject ink onto a workpiece. In a given printer, the print modules are arranged in one or more rows separated along a direction of relative motion between the workpieces and the print modules. Different print modules can eject ink onto different locations of the workpiece and the combination of image portions in these different locations forms the image on the substrate. In color printing, multiple print modules can be used to print multiple colors. Control electronics can coordinate the printing of an image by the print modules.

SUMMARY

In one aspect, the disclosure features a system for use in fluid jetting. The system comprises a first print module comprising a first row of nozzles, a second print module comprising a second row of nozzles, and a controller to receive a first data packet from a remote device at a first moment and a second data packet from the remote device at a second moment after the first moment. The first data packet and the second data packet each contains image data for the first print module and the second print module. Upon receipt of the first data packet, the controller is configured to cause at least some nozzles in the first row, at a third moment, to eject fluid droplets onto a line on a substrate. Upon receipt of the second data packet, the controller is configured to cause at least some nozzles in the second row, at a fourth moment separated from the third moment by a time delay, to eject fluid droplets onto the line on the substrate. The time delay comprises a first portion being integer times a length of a jetting cycle and a second portion being a fraction of the length of a jetting cycle. The time difference between the first and second moments equals the first portion of the time delay and the second portion of the time delay is encoded in at least one of the first and second data packets.

Implementations may include one or more of the following features. During the fluid ejection, the first and second print modules and the substrate are in a relative motion along a first direction. The time delay is determined based on a speed of the relative motion and a distance between the first and second rows of nozzles along a second direction perpendicular to the first direction. There is an encoder for determining the speed of the relative motion during the fluid ejection. The time delay dynamically changes as the speed of the relative motion changes during the fluid ejection. The first row of nozzles and the second row of nozzles are arranged to form one continuous row of nozzles and the time delay is zero. The first row of nozzles and the second row of nozzles are substantially parallel such that the distance is nonzero, and the time delay is nonzero. There is a first memory associated with the first print module and a second memory associated with the second print module. Each memory has a waveform stored for applying to selected nozzles of the first and second print modules to cause the selected nozzles to eject fluid droplets. The controller is configured to process the second portion of the time delay by inserting a leading blank in a waveform stored in the second memory for the second print module before applying the stored waveform to the second print module. There is an interface to receive the first and second data packets serially.

In another aspect, the disclosure features a method for use in fluid jetting at a print head assembly comprising a first print module and a second print module. The first print module comprises a first row of nozzles and the second print module comprises a second row of nozzles. The method comprises receiving a first data packet from a remote device at a first moment, causing at least some nozzles in the first row to eject droplets onto a line on a substrate at a third moment onto a first line on a substrate, receiving a second data packet from the remote device at a second moment after the first moment, and causing at least some nozzles in the second row to eject droplets, at a fourth moment separated from the third moment by a time delay, onto the line on the substrate. The time delay comprises a first portion being integer times a length of a jetting cycle and a second portion being a fraction of the length of a jetting cycle. The time difference between the first and second moments is the first portion of the time delay and the second portion of the time delay is encoded into at least one of the first and second data packets.

Implementations may include one or more of the following features. The time delay is determined based on a speed of the substrate along a first direction during the fluid jetting and a distance between the first and second row of the nozzles along a second direction perpendicular to the first direction. The speed of the substrate is determined based on information from an encoder. The time delay is periodically determined during the fluid jetting based on periodical receipt of information about the speed from the encoder. Causing at least some nozzles in the second row to eject droplets comprises inserting a leading blank representing the second portion of the time delay into a waveform to be applied onto the at least some nozzles in the second row.

In another aspect, the disclosure features a system for use in fluid jetting. The system comprises control electronics residing on a remote computer and a print head assembly remote from the computer. The control electronics configured to generate and deliver data packets for jetting a fluid. The print head assembly comprises a first print module comprising a first row of nozzles, a second print module comprising a second row of nozzles, and a controller configured to receive a first data packet from the control electronics at a first moment and a second data packet from the control electronics at a second moment after the first moment. The first data packet and the second data packet each contains image data for the first print module and the second print module. Upon receipt of the first data packet, the controller is configured to cause at least some nozzles in the first row, at a third moment, to eject fluid droplets onto a line on a substrate. Upon receipt of the second data packet, the controller is configured to cause at least some nozzles in the second row, at a fourth moment separated from the third moment by a time delay, to eject fluid droplets onto the line on the substrate. The time delay comprises a first portion being integer times a length of a jetting cycle and a second portion being a fraction of the length of a jetting cycle. The time difference between the deliveries of the first and second data packets from the computer equals the first portion of the time delay and the second portion of the time delay is encoded in at least one of the first and second data packets.

Implementations may include one or more of the following features. The control electronics communicates with the print head assembly by one or more cables. Each cable allows the data packets to be delivered serially from the control electronics to the print head assembly. The cables comprise optical cables.

Implementations may include one or more of the following advantages. A printing system including multiple rows of print modules is provided to print on one or more workpieces undergoing motion relative to the print modules along a direction perpendicular to the row direction. During printing, the image data for each print module is delivered in the form of data packets from remote control electronics (e.g., a remote computer) through an interface to a controller on the printer housing. The data packets are generated by the remote control electronics that process the image data and divide the image data based on the deployment of the print modules so that each print module prints one or more portions of an image. The portions printed by all print modules combine to form the desired image. The image data for a given scan line (along the rows) of the desired image can be printed by print modules in one or more rows. The time delay between a print module or one row of print modules printing onto the given scan line and another print module or another row of print modules printing onto the given scan line is dynamically calculated during printing. The calculation can be done based on the instant velocity of the relative motion and the distance between the two print modules or two rows of the print modules. The time delay can include a portion that is integer multiplied by the period of a jetting cycle ("integer delay") and another portion that is a fraction of a jetting cycle period ("fractional delay"). The time delay can vary in real time as printing is performed. The image data sets for different print modules or rows of print modules in a given data packet may be associated with delays having different values.

The remote control electronics process the integer delay by timing the delivery of the respective data packets containing the image data. The remote control electronics integrate information about the fractional delays into the data packets. The fractional delay for each print module or each row of print modules can be different. The data packets received at the controller of the printer housing can be processed instantly or can be latched for processing until triggered by receipt of the next data packet. In processing the data packet, the time for initiation of printing by each print module or row of print modules is adjusted based on the fractional delay so that the droplets land at the desired location on the substrates. The locations of the droplets formed on the substrates can be adjusted within a pixel range. The controller at the printer housing includes a small amount of memory and can be made at a low cost.

The details of one or more embodiments of the invention are set forth in the accompanying drawings and the description below. Other features, objects, and advantages of the invention will be apparent from the description and drawings, and from the claims.

DETAILED DESCRIPTION

Figure 1A:
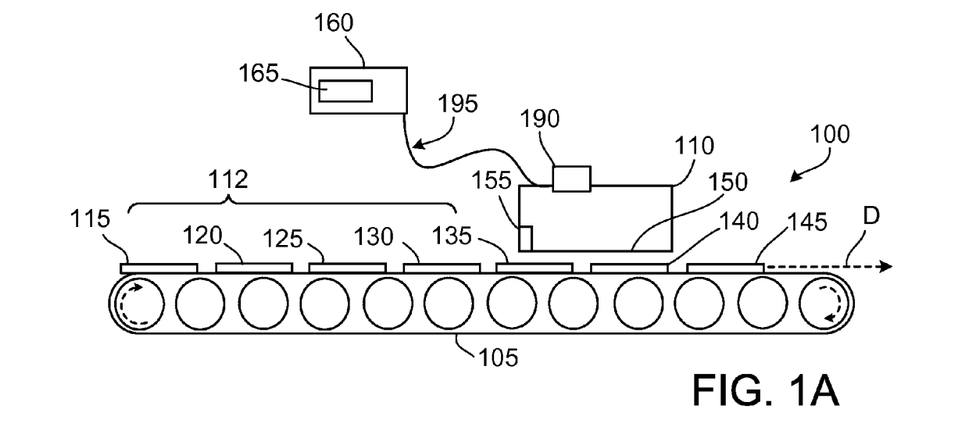
FIG. 1A is a block diagram of a printing system.
Figure 1B:
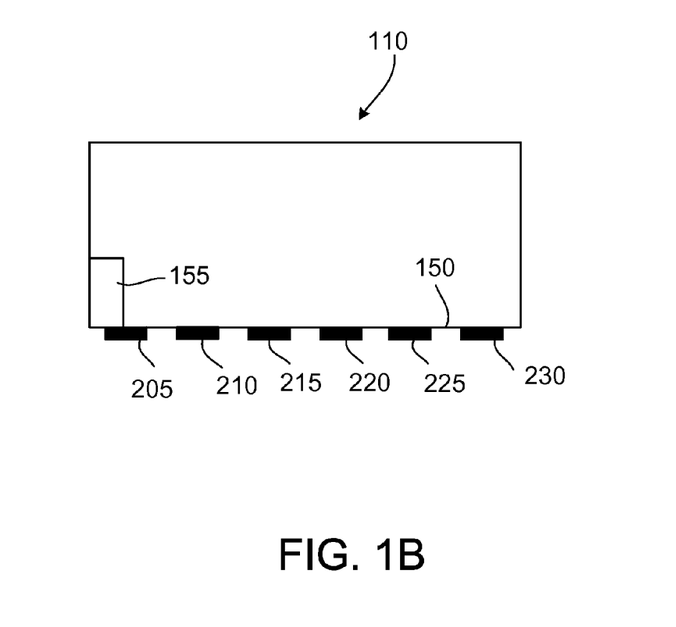
FIG. 1B is a block diagram schematically showing a side view of a printer housing.
Figure 1C:
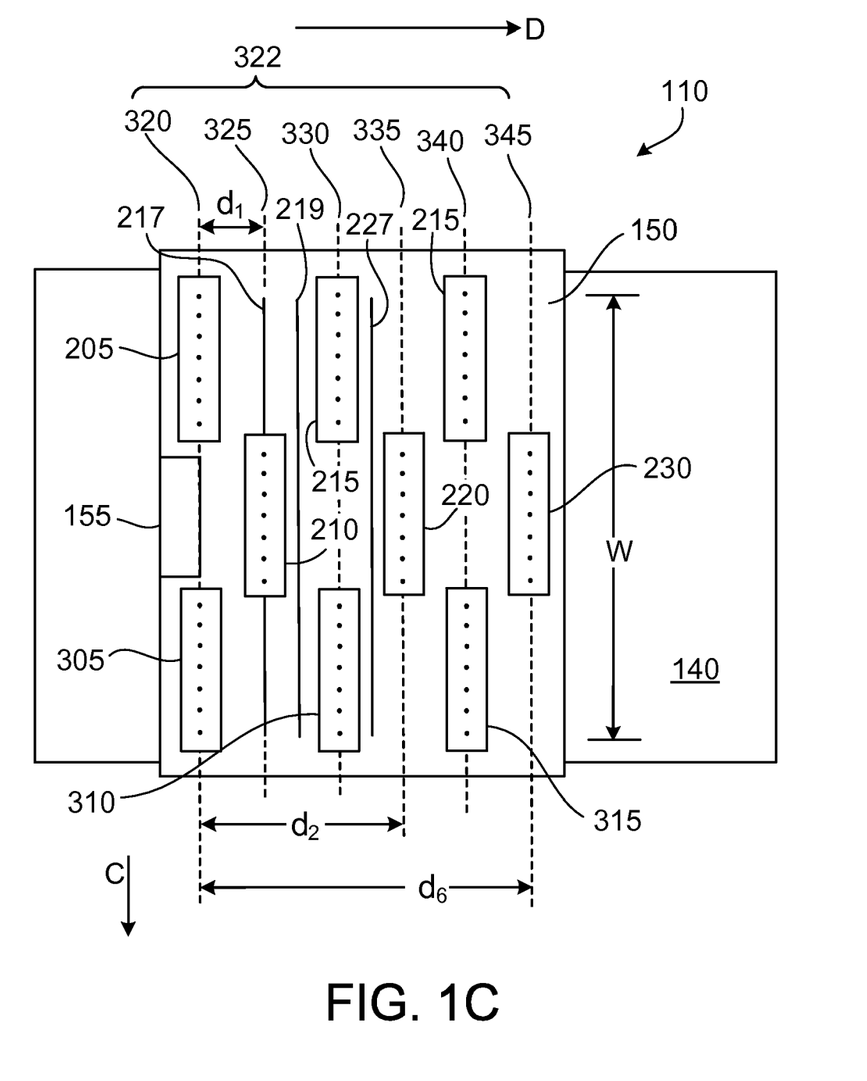
FIG. 1C is a block diagram schematically showing a top view of a printer housing over a workpiece.

Referring to FIGS. 1A-1C, a printing system 100 includes a printer housing 110 that supports a plurality of print modules and a conveyor 105 to carry one or more workpieces 112, e.g., including workpieces 115, 120, 125, 130, 135, 140, 145, . . . , past the print modules. A controller 190 on the printer housing 110 receives printing information including, e.g., image data, from control electronics 160 that are located at a remote location (i.e., outside the printer housing 110) through an interface, e.g., through a serial or a parallel interface. The control electronics 160 can be a remote computer running software, i.e., instructions tangibly embodied in a computer readable device, e.g., a memory, in the remote computer. In the example shown in FIG. 1A, a cable 195, e.g., an optical cable, provides a serial interface between the remote control electronics 160 and the controller 190. However, in some implementations, the serial interface is a wireless interface. Based on the received instructions, the controller 190 instructs one or more of the plurality of print modules 205, 210, 215, 220, 225, 230, 305, 310, 315 to eject fluid droplets onto the one or more workpieces 112.

In some implementations, the printing information received at the printer housing 110 is in the form of data packets (discussed in detail below) sent at a high rate from the remote control electronics 160. For example, one data packet is delivered per period T of a jetting cycle of the printing system 100. The jetting period T is calculated as 1/f, where f is the jetting frequency of the print modules in the printer housing 110. The jetting frequency f can be the nominal frequency at which pixels are printed on the workpieces. In some implementations, the jetting frequency is about 2 KHz, and/or up to about 250 KHz, and the jetting period T is about 4 microseconds or more, and/or up to about 500 microseconds, e.g., about 10 microseconds or more, about 50 microseconds or more, and about 100 microseconds or more.

The print modules 205, . . . , 230, 305, . . . , 315 are mounted on the printer housing 110 and have nozzles exposed near a surface 150 of the printer housing that faces the workpieces. The workpieces 112 are carried by the conveyer 105 in a direction D to produce a relative motion between the workpieces and the printer housing 110. The workpiece conveyor 105 can include a stepper or continuous motor that moves a roller, a belt, or other element that can retain the workpieces 112 during conveyance. The workpieces 112 can be any of a number of different substrates upon which system 100 is to print. For example, workpieces 112 can be paper, cardboard, microelectronic devices, or foodstuffs. Each data packet contains image data to be printed by all print modules on the printer housing 110 during one jetting period T.

Figure 1D:
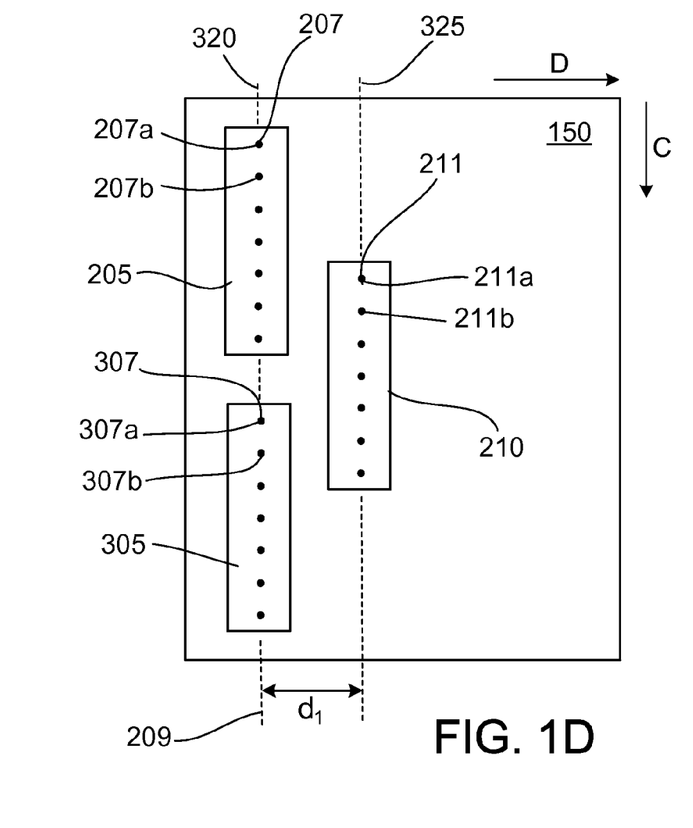
FIGS. 1D-1E are block diagrams schematically showing a bottom view of printer housings.
Figure 1E:
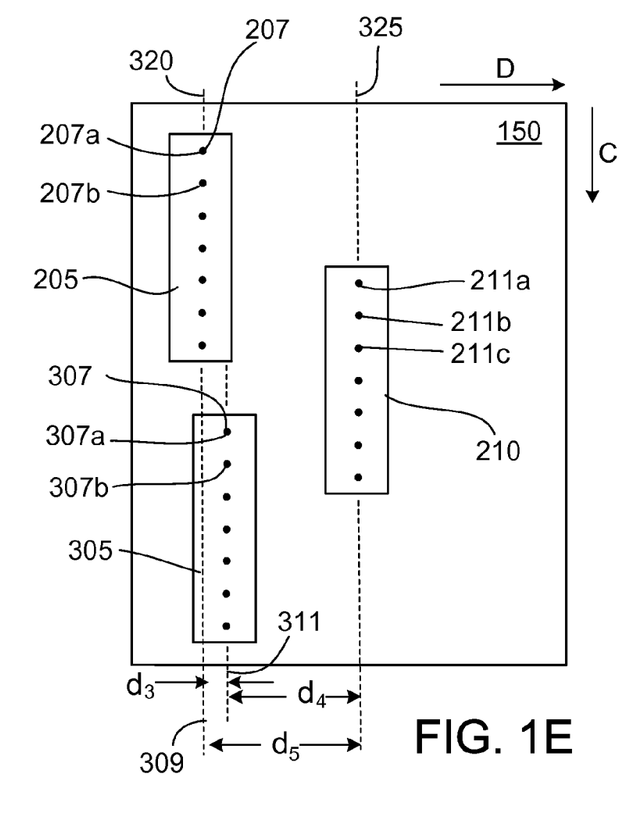

Referring to FIGS. 1D-1E, each print module 205, 305, 210 (others not shown) includes a row 207, 307, or 211 of nozzles 207a, 207b, 307a, 307b, . . . , or 211a, 211b, . . . , extending along a direction perpendicular or nearly perpendicular to the direction D. In some implementations, each print module can include two or more parallel nozzle rows, e.g., the nozzles can be arranged in a two-dimensional array of rows and columns.

The plurality of print modules can be arranged in one or more rows separated along direction D and extending along a direction C perpendicular to the direction D. Referring in particular to FIG. 1C, the print modules are arranged in rows 322 (including parallel rows 320, 325, 330, 335, 340, 345) to cover a width w of an image to be printed on the workpieces 140. In the arrangement shown in FIG. 1C, to print a full scan line, e.g., scan line 217, 219, 227, along the direction C perpendicular to the direction D, more than one print module arranged in two or more different rows are needed along the direction C. As the workpiece 140 moves along the direction D, the print modules in different rows print pixels from a given scan line at different times to form the given scan line. For example, here the print modules are arranged in six rows, one with the print modules 205, 305, another with the print modules 215, 310, another with the print modules 225, 315, and three other rows with print modules 210, 220, 230, respectively.

If two print modules in two separated rows need to print onto the same scan line, the two print modules print at different times separated by a time delay because the location of the scan line on the workpiece arrives beneath the nozzles of the two print modules at different times. The nozzle rows of different print modules in the same row can be aligned in a single line (or single lines when each print module include multiple nozzle rows, for simplicity, a single line is discussed below, which can be readily expanded into multiple lines), e.g., line 209 of FIG. 1D, along the direction C so that nozzles aligned in the single line can also simultaneously eject droplets onto the same scan line. However, in some implementations, the nozzle rows of the print modules in the same row are not aligned in a single line, e.g., the rows are offset along the direction D (e.g., in two lines 309, 311 of FIG. 1E). In such implementations, for the different rows of nozzles from the different print modules in the same row to print onto the same print line, a time delay is implemented between the droplet ejections from the different rows.

As an example, referring to FIGS. 1C-1F, the scan line 227 includes three regions 321, 322, 323 each having a width no greater than the length of an entire nozzle row of a single print module along the C direction. Image portions within the three ranges are printed by at least three different print modules. For example, the image portion within the region 321 can be printed by the print module 205, the image portion within the region 322 can be printed by the print module 210, and the image portion within the region 321 can be printed by the print module 305.

When the nozzles of the print modules 205, 305 are aligned in a single line 209 in the direction C, the print modules 205, 305 eject droplets onto the regions 321, 323 of the scan line 227 simultaneously first, and the print module 210 does not eject droplets onto the scan line 227 until the scan line moves under the nozzle row of the print module after a time delay. This time delay can be longer than a jetting period T.

However, when the nozzles of the print modules 205, 305 are not aligned in a single line, the print modules 205, 305 eject droplets onto the scan line 227 at different times separated by a time delay, which can be smaller than the jetting period T. The print module 210 ejects droplets after another time delay, which can be larger than the jetting period T.

In both situations discussed above, when the delay for print modules 205, 305 is smaller than the jetting period T, image data for the image portions in the regions 321, 323 can be encoded into a data packet (or printing information) and the printing system 100 carries out printing based on the data packet. Image data for the image portion in the region 322 can be contained in a different data packet (or printing instruction) and the printing system 100 carries out printing based on the different data packet at a later time. The printer housing receives the two data packets at different times.

To carry out printing by taking into account all relevant time delays in the manner described above, the time difference (or "delay") $\Delta t$ between droplet ejections of different print modules, in the same row or in different rows, onto a given scan line is calculated and implemented. The delay $\Delta t$ between droplet ejections of any two print modules can be determined based on a distance d between the print modules along the D direction and the speed v of the relative motion between the printer housing 110 and the workpiece 140. In the example shown in FIG. 1E, mathematically, the delay $\Delta t$ for the print modules 205, 305 can be calculated as $d_3/v$, the delay $\Delta t$ for the print modules 305, 210 can be calculated as $d_4/v$, and the delay $\Delta t$ for the print modules 205, 210 can be calculated as $d_5/v$, where v can have a constant or variable value during the printing. In the example shown in FIGS. 1C and 1D, the nozzles in different print modules in the same row are aligned in a single line, and the time delay for the print module rows 320, 325 can be calculated as $d_1/v$, and the time delay for the print module rows 320, 335 can be calculated as $d_2/v$. The time delay $\Delta t$ can be calculated dynamically during printing. The distance between different print modules or rows of print modules can be obtained from a test printing. For example, the modules can fire simultaneously while the test workpiece is not moving, and based on the droplets formed on the test workpiece, nozzle locations of the print modules can be determined. In some implementations, the distances are known at the time the printer housing is installed. The varying speed v can be obtained from an encoder (not shown) periodically during printing.

Figure 1F:
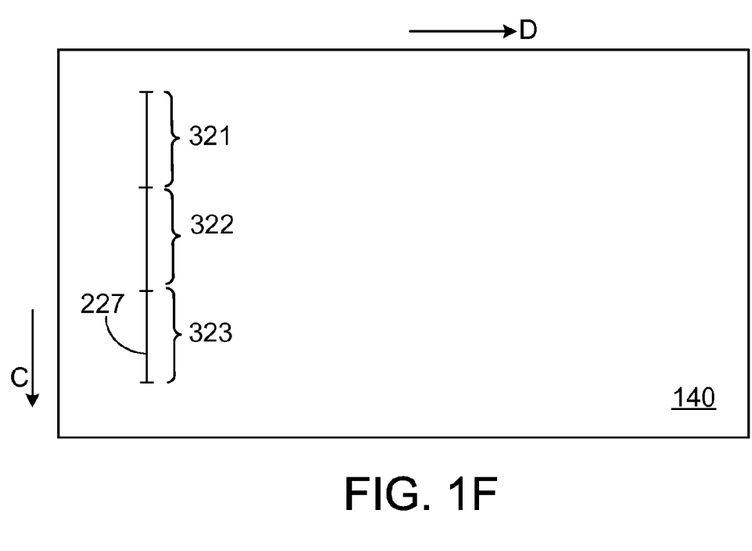
FIG. 1F is a schematic diagram of a scan line on a workpiece.

In some implementations, more than one print module prints in a given region, e.g., the region 322, of the scan line 227 of FIG. 1F. For example, in addition to the print module 210, the print modules 220, 230 may also need to print onto the scan line 227, e.g., in color printing where the modules 210, 220, 230 each print in a different color. The delay $\Delta t$ can be similarly calculated as $d_2/v$ and $d_6/v$ for the print modules 220, 230, respectively. In a desired arrangement, $d_2$ can be three times $d_1$ and $d_3$ can be five times $d_1$. However, adjacent module rows may not be separated by perfectly equal distance.

The calculated delay $\Delta t$ accounts for any differences in nozzle location in the D direction, desired or not, between different rows of the print modules along the direction C, and also misalignment of the print modules in the same row (e.g., as shown in FIG. 1E).

The dynamically calculated delay $\Delta t$ can be smaller or larger than the jetting cycle T of the print system 100. For example, $\Delta t$ can be 0.2 T, 0.8 T, 2.4 T, 3.7 T, or other values, depending on the distance d between the print modules along the direction D and the speed v of the relative motion. Generally, $\Delta t$ is the sum of two time periods, the first period $\Delta t$ equals an non-negative integer multiple of the time T, i.e., $\Delta t_n = N*T$ where N is a whole number, and the second period $\Delta t_i$ equals a fraction (less than 1) of time T, i.e., $\Delta t_i = M*T$, where M is a real number between 0 and 1. Given the practical manufacturing tolerances and variations in the speed v, M would usually be greater than 0. For a given nozzle, two droplets ejected with a time separation of $\Delta t$ are separated on the substrate 140 along the direction D by an integer multiple of pixels, and two droplets ejected with a time separation of $\Delta t_i$ are separated by a fraction (less than 1) of a pixel (or fractional pixel). In some implementations, the fraction of a pixel based on $\Delta t_i$ is about 2 bits or more, e.g., up to about 8 bits of the pixel.

Other than compensating module arrangement, the delay $\Delta t$, particularly the fractional delay $\Delta t_i$ can also correct quantization-created drop placement errors that are generally smaller than the pixel spacing. The resolution fractional pixel correctable by the fractional delay can be 2 bits to correct a quantization error of about ±⅛ pixel (¼ pixel in total). The print modules are configured to implement fractional delays of about 0 T, 0.25 T, 0.50 T, and/or 0.75 T. In some implementations, the delay $\Delta t$ can also originate changes in the printing speed, e.g., the speed of the conveyor 105, or changes in the environmental temperature and humidity in which printing is carried out.

The system 100 implements the delay $\Delta t$ between droplet ejections of print modules by activating the nozzles of the print modules based on print data at different times separated by the delay $\Delta t$. To reduce the amount of memory and complexity at the printer housing 110, the system 100 processes the image data, calculates the delay $\Delta t$, generates the data packets, and times the deliveries of the data packets using the control electronics 160. In particular, the control electronics 160 process the integer time delay $\Delta t_n$, e.g., by waiting until most of or the entire period $\Delta t_n$ lapses before delivering a corresponding packet to the printer housing. In some implementations, for a particular set of image data, the electronics 160 uses a hardware delay of the period $\Delta t_n$ by integral firing periods, i.e., sending a portion of the data through a first-in-first-out data register to delay the data before including and transmitting the data in a data packet to be delivered to the printer housing. The delay $\Delta t_n$ can also be implemented with regard to the set of image data by applying an offset when selecting the image data from the image buffer for generating the data packet. Details of the implementations are also discussed further below.

In some implementations, the printer housing 110 receives the image packets that contain image data to be printed within the same jetting period T as the receipt. Information in each received data packet is stored at the printer housing 110 for no longer than one jetting period. In some implementations, the printer housing stores, e.g., latches, the image data in a received data packet and does not use the image data to initiate droplet ejections by any print modules until a triggering event takes place, e.g., receipt of a subsequent data packet. Information in each data packet is stored on the printer housing 110 for no longer than two successive jetting periods T. The triggering event is chosen such that the printer housing does not simultaneously store data for printing more than two pixels for a given nozzle (e.g., one register to store a pixel to control whether the drive pulse is applied to the actuator for the nozzle during a given jetting period, and another register to receive the data being transmitted from the control electronics 160 during the given jetting period for a subsequent pixel).

In these implementations, image data for all print modules to be printed within the same jetting period T is incorporated into one data packet and delivered to the printer housing. In some situations, this means that all image data in the data packet is associated with the same integer multiple M. The image data for different print modules can be associated with different fractional delays that are implemented at the printer housing.

The following discussion is based on storing information of each received data packet at the printer housing 110 for no longer than one jetting period T. However, the implementations can be readily realized in situations when the information of each received data packet is stored at the printer housing 110 for a time period between T and 2T, as explained further below.

As explained above, the control electronics 160 process the time separation $\Delta t_n$. Accordingly, the data packets to be delivered to the printer housing do not have to contain information related to $\Delta t_n$. However, the data packets include information about the time separation $\Delta t_i$ so that the printer housing 110 can process the image data contained in the received data packets and initiate activation of the print modules for droplet ejection at proper times. The combined processing of $\Delta t_n$ at the control electronics 160 and processing of $\Delta t_i$ at the printer housing 110 allows the entire time delay $\Delta t$ to be taken into account for the printing.

Figure 2A:
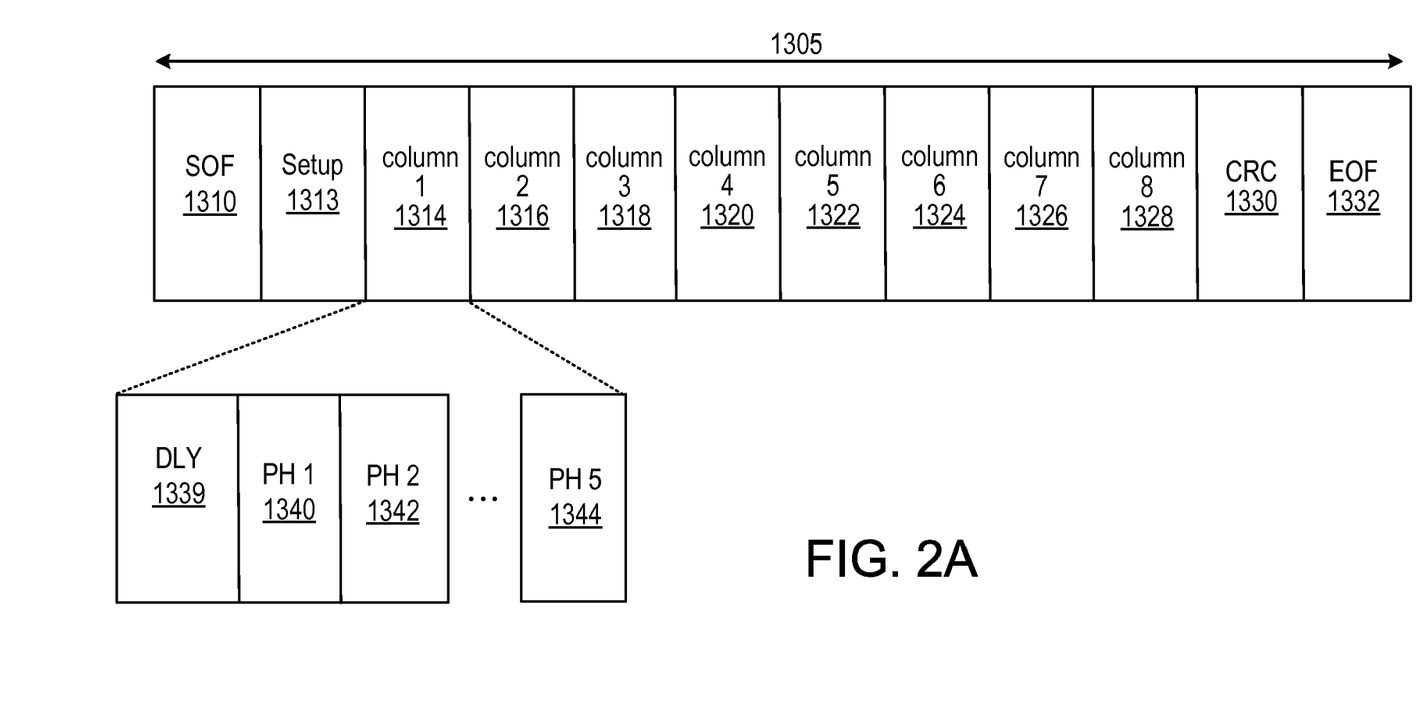
FIGS. 2A and 2B are schematic diagrams of data packets.
Figure 2B:
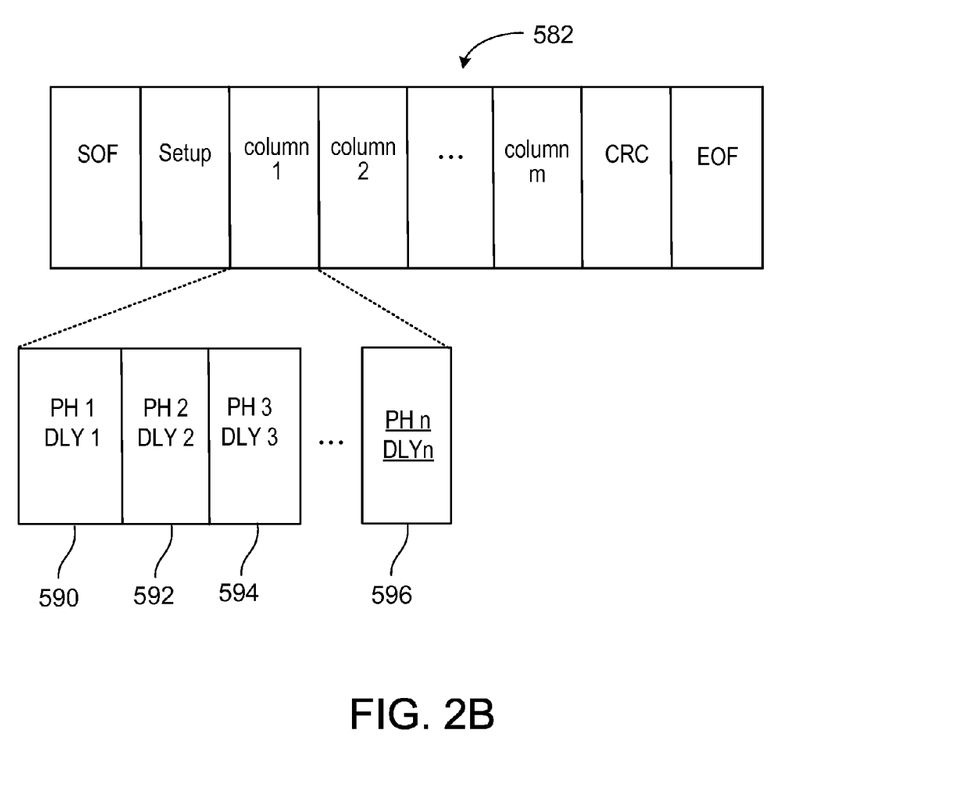

Examples of data packets are shown in FIGS. 2A and 2B. A packet 1305 of image data generated by the control electronics 160 includes all information to be used in one jetting cycle T by a printer housing that includes eight rows of print modules. The packet 1305 has a start of frame (SOF) 1310 and setup data 1313. The setup data 1313 may specify an address of the printer housing so that the data packet 1305 can be delivered to the intended destination, e.g., when multiple printers are connected to the computer on which the control electronics reside. The setup data can also specify an operating mode on the printer housing (e.g., forward direction or reversion direction). The data packet 1305 also includes CRC (cyclic redundancy check) 1330, which can be a 32-bit number generated from the data being sent so that the controller 190 can verify that the entire data packet was sent correctly. The last word of the data packet is the End of Frame 1332 to complete the data packet 1305. Between the setup data 1313 and the CRC 1330, the data packet 1305 contains image data to be processed by each print module in the printer housing 110.

The data packet 1305 can be used when all print modules in the same row share the same calculated delay $\Delta t$, when, e.g., nozzle rows of the print modules in the same row are substantially aligned in the same line. In some implementations, this simplified delay implementation is taken regardless of whether these nozzle rows are in the same line. The image data 1314-1328 for each row of print modules includes delay data that specifies the associated delay $\Delta t_i$ to be implemented by all print modules in the row, and image data for each print module in the row. For example, the image data for row 1 includes delay data DLY 1339 that specifies the delay $\Delta t_i$ for all print modules in row 1. The image data for row 1 also includes image data 1340 for a first print module PH 1 in row 1, image data 1342 for a second module PH 2 in row 1, . . . , and image data 1344 for a fifth print module PH 5 in row 1 (assuming row 1 includes five print modules). Upon receiving a data packet such as the data packet 1305, the controller of the printer housing, e.g., the controller 190 of FIG. 1A, processes the data packet and each print module implement prints by taking the fractional delay into account (details explained below).

A data packet 582 shown in FIG. 2A and also including SOF, setup data, CRC, and EOF (similar to those of the data packet 1305) contains delay information DLY1, DLY2, . . . , DLYn for each print module in a printer housing. The calculated delay portion $\Delta t_i$ for each print module can be interspersed with the image data 590, 592, 594, . . . , 596 for each print module. Although the delay data is illustrated in FIG. 1F as preceding its associated image data, the delay data could immediately follow the associated image data, or all of the delay data could collected, e.g., before the image data for column 1 or after the image data for column 8, rather than interspersed with the columns. The fractional delay $\Delta t_i$, expressed as a fraction of the jetting period T, can be encoded in two to eight bits, e.g., five bits. In some implementations, the fractional delay can $\Delta t_i$ also be expressed as a multiple of the highest time resolution (corresponding to the highest sub-pixel resolution). For example, when the smallest $\Delta t_i$ of the printing system 100 is $t_{min}$, e.g., T/4, any $\Delta t_i$ is a multiple of $t_{min}$. When so expressed, fewer bits are required to encode the delay $\Delta t_i$ in the data packet than to encode the delay expressed as a fraction of the jetting period T.

In some implementations, for simplification, the printing system 100 neglects the variation in printing speed v and only monitors environmental temperature and humidity changes, which do not occur frequently during printing. In such an embodiment, the time delay $\Delta t$ (e.g., originated from module arrangement) does not change within a relatively long period of time, e.g., 10 minutes, an hour, or even longer. The time delay $\Delta t$ only needs to be calculated once within this period. A user can be allowed to configure the printing system 100 to operate in this simplified manner, and can determine the length of the period.

Referring again to FIGS. 1A-1C, the data packet 1305, 582 of FIGS. 2A and 2B can be generated by the control electronics 160 that include one or more data processing devices for performing operations in accordance with the logic of a set of machine-readable instructions. The control electronics 160 may be, for example, a personal computing system that runs image processing software and software for controlling printing at the printer housing 110. A print image buffer 165 within the control electronics 160 includes one or more data storage devices that store image data for printing by print modules. For example, the print image buffer 165 can be a collection of random access memory (RAM) devices. The print image buffer 165 can be accessed by the control electronics 160 to store and retrieve image data.

The control electronics 160 may have special circuitry for generating data packets to send to the printer housing 110. For example, the control electronics translates the received image data to be understandable by the print modules at the printer housing and divide the image data based on the deployment of the print modules. The image data received by the control electronics 160 can be a stand-alone collection of data regarding an individual image. For example, the image data can be a graphic image format (gif) file, a joint photographic experts group (jpeg) file, PostScript, Printer Command Language (PCL), or other image data collection. The translated image data can be bitmap raster data, which can be further converted into jetmap data. Converting bitmap raster image data into jetmap data involves taking an input bitmap, which is arranged in an order corresponding to a geographic order used by the bitmap image format, and rearranging the bitmap raster image data to correspond to physical locations of the print modules. It may also involve dividing the image data as part of the process of converting the bitmap raster image data to jetmap data (i.e., the jetmap data is divided into image buffers corresponding print modules or print module rows). As an example, jpeg formatted image data may be converted to bitmap formatted image data, and then to jetmap image data as image buffers corresponding to print modules or print module rows. In an alternative implementation, image data may be converted directly to jetmap data without first converting to an intermediary format.

The image data can be divided according to the deployment of the print modules by identifying portions of the image data that are to be printed by associated print modules. The associated print modules can be a row of print modules. For example, the image data in the data packets 1305 and 582 are divided for each row of print modules. The image data can be further divided for each print module. The image data can be translated before it is divided, divided before it is translated, or translated and divided as part of the same process. The divided image data can be stored at a buffer 165 for further processing, e.g., generation of printing instructions at proper times.

During printing, a substrate detector 155, e.g., a sensor, e.g., an optical sensor such as an optical interrupter, detects the leading edge of a particular workpiece arriving under the printer house 110 and generates a trigger signal in response to detecting the leading edge. The control electronics receives the trigger signal from the substrate detector 155 and accesses the stored image data in the buffer 165. Data packets containing corresponding time periods $\Delta t_i$ are generated and delivered by the control electronics 160 to the controller 190 at controlled times with $\Delta t_n$ implemented. The data packets are delivered at high data rates to print images on the workpieces as the workpieces move along the workpiece conveyor 105. Upon receiving the data packet, the print modules in different rows may print at different times within a jetting cycle T, depending on the delay portion $\Delta t_i$ for each print module or each row of the print modules. When the data packet specifies a delay for each individual print module (such as the data packet 582 of FIG. 2A), the print modules in the same row may print at different times or moments. In some implementations, all print modules in different rows print simultaneously.

Figure 3:
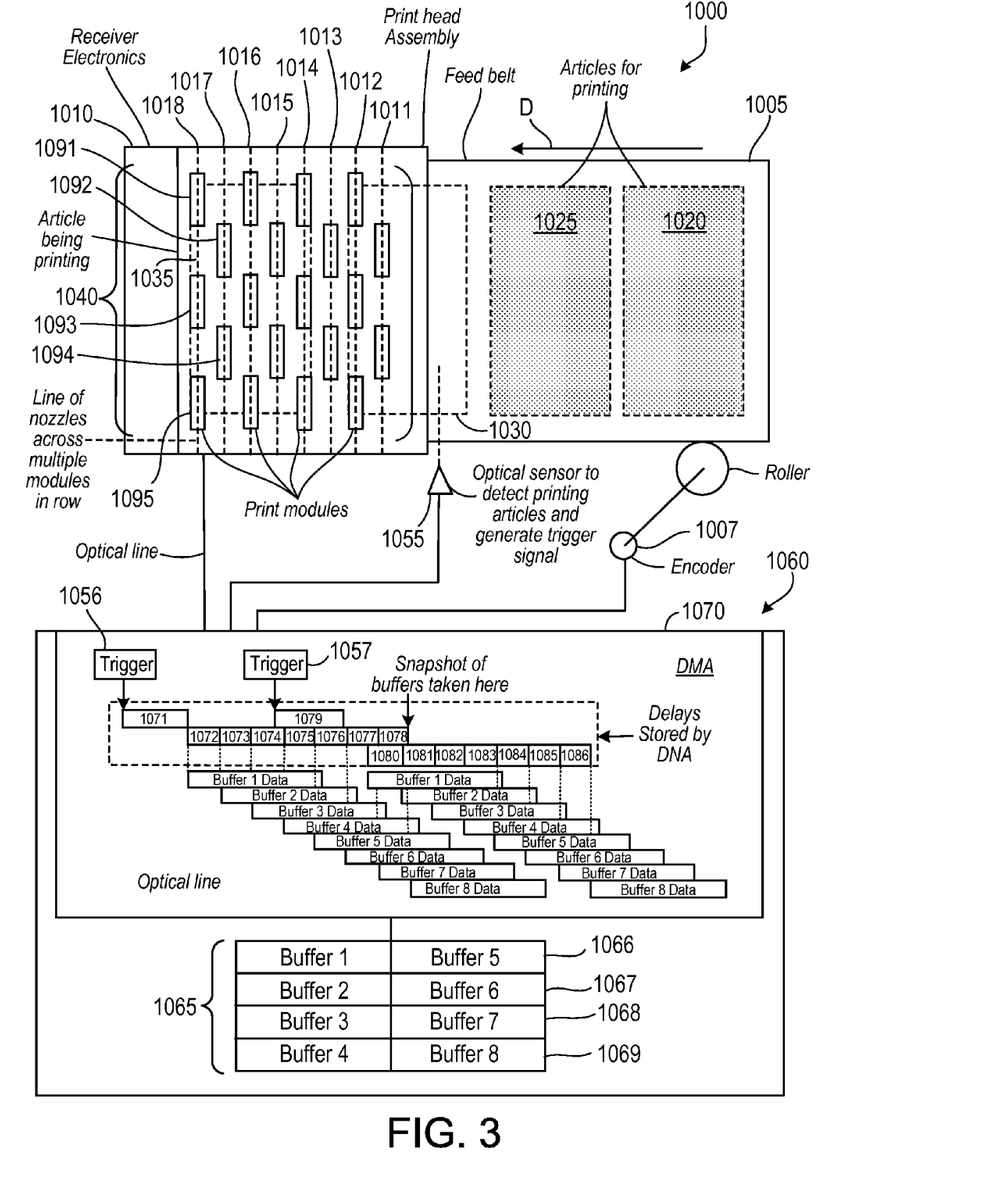
FIG. 3 is a schematic diagram of an implementation of a printing system.

FIG. 3 shows another implementation, similar to the implementations discussed in FIG. 1C, together with FIGS. 1A-1B, and 1D-1F, but provides more details regarding the image buffer at the control electronics and implementation of the delay $\Delta t_n$ by the control electronics. Print modules 1091, 1093, 1095 mounted on a printer housing 1010 in a system 1000 eject droplets onto workpieces 1020, 1025, 1030, 1035 that are moved by a workpiece conveyor 1005 along a direction D. Control electronics 1060 are implemented remotely relative to the print housing 1010, e.g., on a computer. The system 1000 also includes a workpiece detector 1055, which can be an optical sensor that detects the position the workpieces 1020, 1025, 1030, 1035, and generates trigger signals (such as trigger signals 1056 and 1057) based upon that detection.

The workpiece conveyor 1005 includes a sensor 1007 that senses the speed of the workpieces 1020, 1025, 1030, 1035. The sensor 1007 could be an encoder coupled to the motor that drives the conveyor 1005 or an encoder coupled to a rotatable wheel that contacts the conveyor 1005, and thus generates a signal based on the speed of the conveyor 1005, or an imaging apparatus (which could include the detector 155) that determines the speed of the workpiece from a sequence of images of the workpiece. The encoder 1007 also generates a signal that encodes the sensed speed and relays the signal to control electronics 1060, e.g., for the control electronics to determine the time delay $\Delta t$ for generation and delivery of the data packets to the printer housing 1010.

The printer housing 1010 includes a collection of print modules arranged laterally along a series of rows 1011, 1012, 1013, 1014, 1015, 1016, 1017, 1018. This arrangement of print modules spans an effective print area 1040. Corresponding to each row of print modules, the control electronics 1060 provides an allocated print buffer in a collection 1065 of print image buffers. In the configuration shown in FIG. 3, there are eight print image buffers in the collection 1065, and each print image buffer is dedicated to a row of print modules arranged along one of rows 1011, 1012, 1013, 1014, 1015, 1016, 1017, 1018. For example, print image buffers 1066, 1067, 1068, 1069 correspond to the print rows 1015, 1016, 1017, 1018, respectively. The control electronics 1060 can access each print image buffer in collection 1065 to store and retrieve image data. For example, the control electronics 1060 can allocate the image data divided based on the deployment of the print modules to an appropriate print image buffer in the collection 1065. In some implementations, each print module or each row of print modules prints image data only from the associated print image buffer.

The control electronics 1060 communicate with each buffer in the collection 1065 using a data pump 1070 positioned along a data communication path between the print modules and their dedicated print image buffers in the collection 1065. The data pump 1070 is a functional component, e.g., implemented in hardware, software, programmable logic or a combination thereof, that processes data and transmits it to one or more printing devices for printing. In one implementation, the data pump 1070 can be a direct memory access (DMA) device. The data pump 1070 can receive and store image data from each print image buffer in collection 1065. In some implementations, the data pump 1070 is programmed by control electronics 1060 to delay the communication of information from the print image buffers in collection 1065 to the row of print modules, e.g., by the calculated delay $\Delta t_n$ for each row of print modules. For example, when instructed to, the data pump 1070 immediately generates the data packet but does not deliver the data packet until the delay $\Delta t_n$ has been implemented (or lapsed), or the data pump 1070 does not generate the data packet immediately, but instead waits until the delay $\Delta t_n$ has been implemented (or lapsed) and delivers the data packet immediately after generation. In some implementations, different print modules in the same row may have different delays $\Delta t_n$ and each print module is associated with a collection in the image buffer. The control electronics 1060 and the data pump generate and/or deliver data packets similarly to generating and/or delivering data packets based on rows of print modules. In a given data packet, all image data for different print modules is associated with the same $\Delta t_n$.

In particular, as the workpiece 1035 is conveyed by the workpiece conveyor 1005 to enter an effective print area 1040, the workpiece detector 1055 detects the leading edge of workpiece 1035 and generates trigger signal 1056. Based on receipt of trigger signal 1056, the control electronics 1060 can program the data pumps 1070 with delays 1071, 1072, 1073, 1074, 1075, 1076, 1077, 1078. The delay 1071 delays the delivery of an image data packet by a calculated $\Delta t_{n1}$ from a first print image buffer in the collection 1065 to the row of print modules 1011. The delay 1072 delays the delivery of an image data packet a calculated $\Delta t_{n2}$ (which may be the same as or different from $\Delta t_{n1}$) from a second print image buffer in the collection 1065 to the row of print modules 1012. The delays 1073, 1074, 1075, 1076, 1077, 1078 delay the delivery of image data packets by respectively calculated $\Delta t_n$ from respective print image buffers in the collection 1065 to the print module rows 1013, 1014, 1015, 1016, 1017, 1018. As described above, in some implementations, instead of each row of print modules, each print module is associated with a delay $\Delta t_n$. All image data associated with the same delay relative to a time reference point is extracted by the data pump 1070 to be incorporated into a data packet. Similarly, the data pump can form the data packet after the lapse of the delay, or can deliver the data packet after the lapse of the delay.

As the workpiece 1035 is conveyed by the workpiece conveyor 1005 across effective print area 1040, the print modules arranged along rows 1011, 1012, 1013, 1014, 1015, 1016, 1017, 1018 successively print onto one given scan line (if necessary based on the image data). In particular, as workpiece 1035 is advanced one scan line across effective print area 1040, the data pump 1070 delivers an image data packet to the appropriate receiver electronics at the print modules arranged along rows 1011, 1012, 1013, 1014, 1015, 1016, 1017, 1018 (i.e., the data pump 1070 causes the image data to be transmitted to the printing device). The delivered image data packet identifies print modules that are to fire for the instantaneous position of workpiece 1035 in effective print area 1040. The identification of print modules may be explicit by addressing the respective print modules, or implicit by ordering the image data in the data packet in a format corresponding to an order of print modules and/or print module rows at a printer housing. Image data for successive jetting cycles can be loaded from the print image buffers in the collection 1065 to the data pump 1070 during printing.

While droplets are being ejected onto the workpiece 1035, the workpiece 1030 conveyed by the workpiece conveyor 1005 may be entering the effective print area 1040. In some implementations, a workpiece, e.g., the workpiece 1030, enters the effective print area 1040 before another workpiece, e.g., the workpiece 1035, exits the effective print area 1040. The print modules can print on multiple workpieces in the effective print area 1040 simultaneously. For example, the print modules print on the workpiece 1030 before printing on workpiece 1035 ends. Similarly, the workpiece detector 1055 detects the leading edge of workpiece 1030 and generates a trigger signal 1057. Based on receipt of the trigger signal 1057, the control electronics 1060 may cause the data pump 1070 to implement delays 1079, 1080, 1081, 1082, 1083, 1084, 1085, 1086 for generating and delivering data packets. The delays 1079-1086 can be similarly calculated and implemented as the delays 1071-1078. Implementations of the delay $\Delta t_n$ are also described in U.S. Pat. No. 7,722,147, the entire content of which is incorporated herein by reference.

Figure 4A:
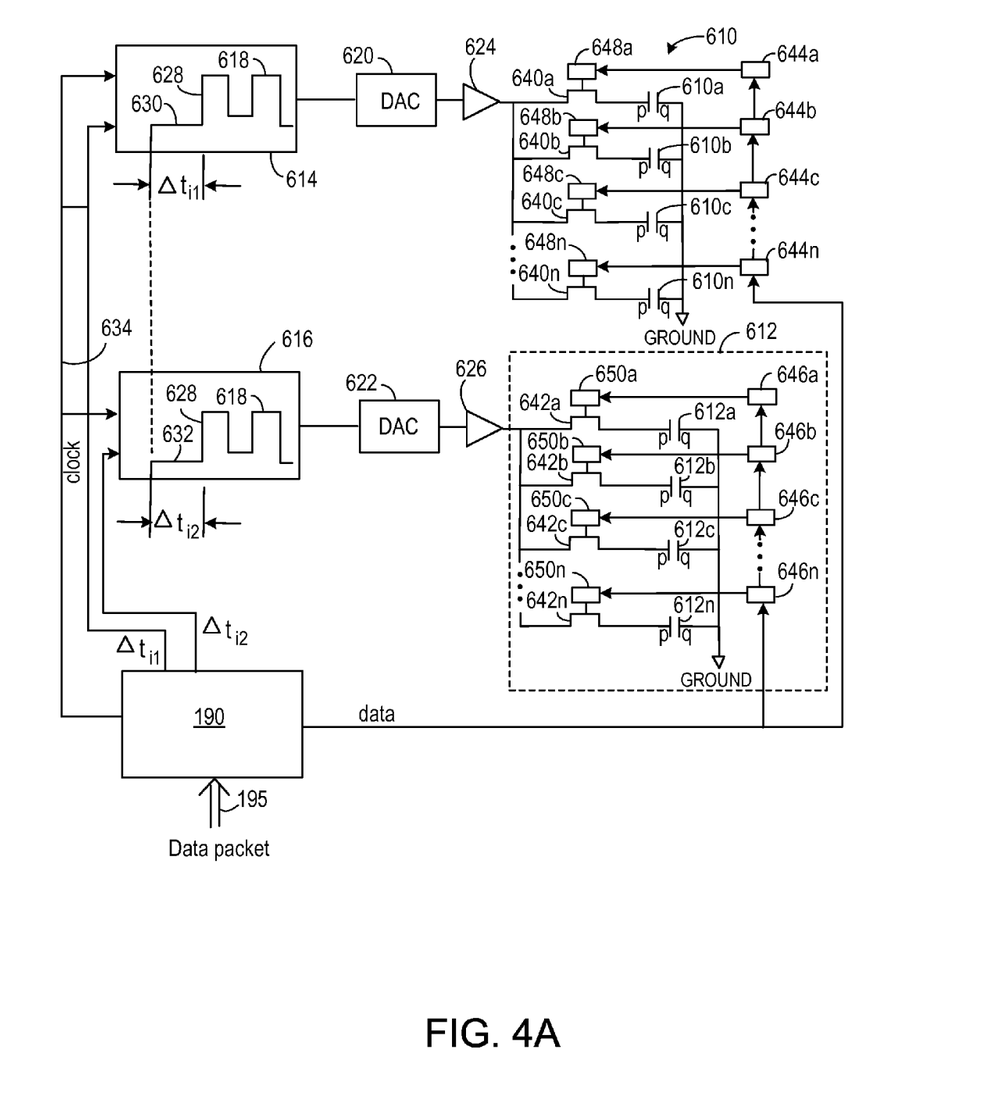
FIGS. 4A-4B are schematic diagrams of an implementation at printer housings.

The controller 190 of FIG. 1 receives the data packets delivered from the remote control electronics 160 and implements the delay portion $\Delta t_i$ so that the image data in each data packet for different rows of print modules (see, e.g., FIG. 2A) or different print modules (see, e.g., FIG. 2B) is printed at the proper times. Referring to FIG. 4A, the controller 190 receives a data packet through the cable 195 from control electronics (not shown). The data packet contains delay information and image data for each print module 610, 612. Each print module 610, 612 includes piezoelectric elements 610a, 610b, 610c, . . . , 610n, 612a, 612b, 612c, . . . , 612n for activating corresponding nozzles (not shown) based on the image data and delay information for printing. The two print modules 610, 612 can be in the same row or in different rows, and although not shown, more, e.g., any number of, print modules can be included. Each piezoelectric element can be activated by a voltage difference applied over two surfaces p, q of the element, which is schematically shown in FIG. 4A. In the example shown in the figure, one surface p of each piezoelectric element receives a waveform signal (or voltage) from a waveform 618 stored in memories 614, 616, each memory being associated with one print module. The other surface q of each piezoelectric element is grounded. In particular, when the leading edge (or voltage raise) 628 of the stored waveform 618 is applied to the surface p of the piezoelectric element, the piezoelectric element is activated and ejection of ink is initiated.

The controller 190 controls the delivery time of the waveform 618 to the piezoelectric elements by implementing the corresponding delay $\Delta t_{i1}$, $\Delta t_{i2}$ for the print module 610, 612 from the received data packet. The controller 190 includes a clock, e.g., an internal clock or a clock signal derived from an external input, that controls the timing of the waveform delivery and delay implementation. The clock signal 634 from the controller 190 has a frequency higher than the jetting frequency f so that fractional delays (less than the jetting period T) can be implemented. For example, the frequency can be 2 f, 4 f, or 8 f, or even higher. The frequency of the clock determines the precision of the delay implementation.

In some implementations, the controller 190 shifts the waveform 618 by inserting a leading blank 630, 632 corresponding to the delays $\Delta t_{i1}$, $\Delta t_{i2}$ in front of the leading edge 628. The modified waveforms with the leading blanks 630, 632 are delivered to a digital-analog converter (DAC) 620, 622, which are then amplified using amplifiers 624, 626 and delivered to the piezoelectric elements.

Alternatively, each memory 614, 616 includes a pointer stored in a register (not shown) associated with the waveform 618. The pointer is initialized at a point relative to the leading edge 628 of the waveform. When fluid is to be ejected, the pointer scans through the associated memory 614, 618, with the value at the position of the pointer being output, thereby generating the waveform. Upon receiving the fractional delay information, the controller 190 adjusts the position of the pointer towards or away from the leading edge so as to generate the delays $\Delta t_{i1}$, $\Delta t_{i2}$. This produces a desired waveform starting from the position of the pointer for delivery to the DAC 620, 622. After the waveform is delivered, the pointer returns to its initialized point. When the delays for different print modules are different, the waveforms delivered to these print modules, with leading blanks or starting from the pointer position, are different. In another embodiment, the same waveform 618 is delivered to different DACs at different times. The controller 190 or each memory lets a corresponding delay lapse before delivering the waveform from the memory to the DAC.

The waveform signals delivered from the memory 614, 616 are selected by a switch 640a, 640b, 640c, ..., 640n, 642a, 642b, 642c, ... 642n corresponding to a specific piezoelectric element, so that only those piezoelectric elements corresponding to nozzles to eject droplets within the jetting cycle receive the waveform signals at the surfaces p. The switches are controlled by the image data latched into respective latches 644a, 644b, 644c, ..., 644n, 646a, 646b, 646c, ..., 646n, each corresponding to a nozzle. The latched image data for each nozzle is delivered to a corresponding register 648a, ..., 648n, 650a, ..., 650n to control the switches. In particular, the register turns the switch on when its corresponding nozzle has image data to be printed in a given jetting cycle and turns the switch off when the nozzle does not print in the given jetting cycle. When the switch is turned on, the amplified waveform signals from the amplifier 624, 626 are applied to the p surface of the piezoelectric element, causing a voltage difference over the two surfaces of the piezoelectric element. When the switch is turned off, the waveform signals do not reach the corresponding piezoelectric element and the piezoelectric remains inactivated during that jetting cycle.

Figure 4B:
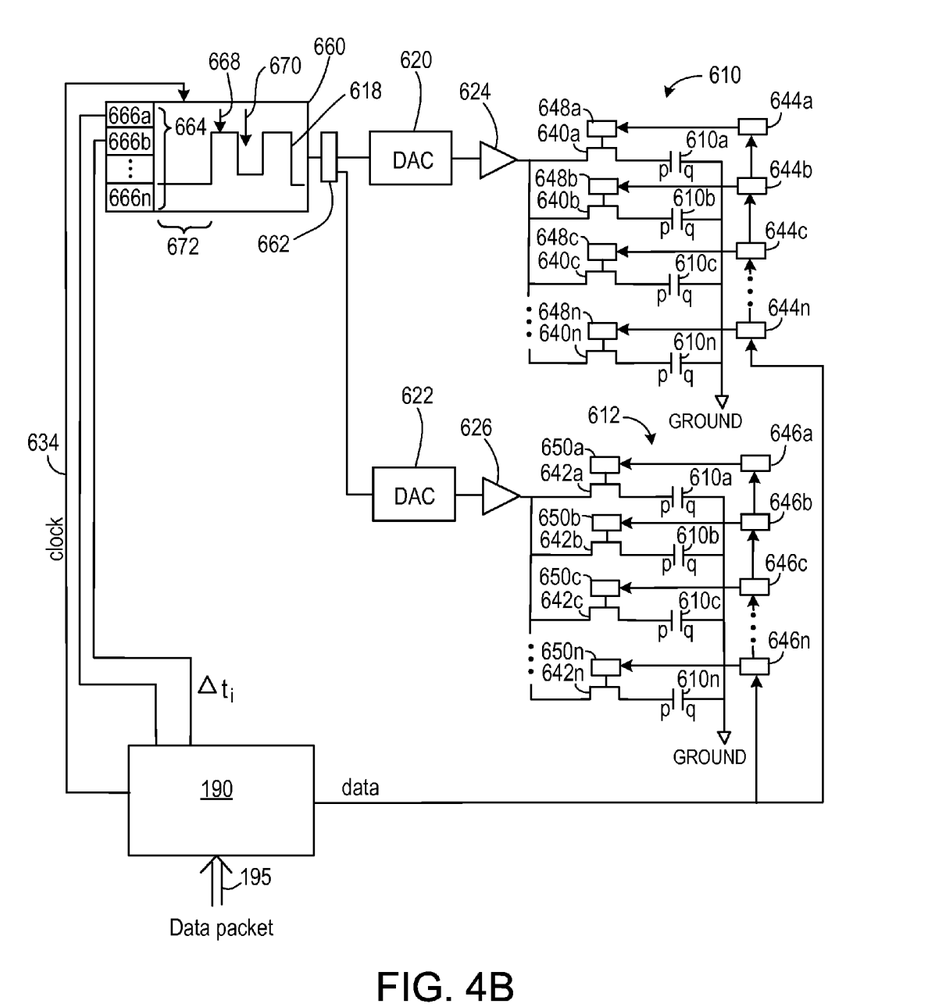

In some implementations, only one piece of memory is needed at the printer housing for multiple print modules, e.g., print modules 610, 612. Referring to FIG. 4B, a piece of memory 660 stores the waveform 618 and a buffer 664 containing buffer regions 666a, 666b, 666n, each being associated with a pointer, e.g., a pointer 668, 670. The number of buffer regions corresponds to the number of print modules to which the memory 660 is associated. The pointers can be initiated to a point relative to the leading edge 628 of the waveform 618. The controller 190 at the printer housing delivers the delays $\Delta t_{i1}$, $\Delta t_{i2}$, ..., $\Delta t_{in}$ (n is 2 in the example shown by the figure) for each print module 610, 612, received from a data packet to the corresponding buffer regions. Based on the delays and the clock signal 634 from the controller 190, the pointers 668, 670 move relative to their initial points or to the leading edge 628 of the waveform 618 to take the received delays into account. In some implementations, the waveform 618 includes a sufficient amount of leading blank 672 before the leading edge 628 for the pointers to move away from the leading edge 628. A waveform starting from the position of the pointer is delivered to a corresponding DAC. When the delays for different print modules are different, the waveforms delivered to the different print modules are different. The different waveforms can be delivered to their corresponding print modules through a multiplexer 662. For example, the value from the waveform indicated by each pointer is output in sequence from the memory, and directed to a latch by the multiplexer, before the pointer values are advanced. In some implementations, each buffer region stores information about the initial position of the pointer and allows for the pointer to return to this position at the end of the jetting cycle after a waveform is delivered. In other implementations, each buffer region stores information about the current position of the pointer. When a delay is received, the new position of the pointer that corresponds to the waveform to be delivered is calculated based on the current position and the delay.

The implementations of FIGS. 4A and 4B can also be applied to the situation when each row of print modules in a printer housing share the same delay. For example, in such a situation, the memories 614, 616 of FIG. 4A are each associated with a row of print modules, and n is the total number of nozzles in each print module row.

Sample drive waveforms stored at the memory are described in U.S. Patent Application Publication no. 20060164450, U.S. Patent Application Publication no. 20060181557, and U.S. Pat. No. 7,988,247, the entire contents of which are incorporated herein by reference. Sample print modules including piezoelectric elements as actuators are described in U.S. Pat. Nos. 5,265,315, 4,825,227, 4,937, 598, 5,659,346 and 5,757,391, the entire contents of which are incorporated herein by reference.

In some implementations, the pieces of memory 614, 616, 660 can be one or more portions of one or more floating-point gate array (FPGA) integrated circuits (IC). The costs and engineering design efforts to implement the print modules may also be reduced because little or no buffering of high speed image data is required at the print modules. Because the printer housing 110 uses a reduced amount of memory, the printer housing 110 may be implemented at a lower cost. The system 100 may offer scalable transmission of high bandwidth, synchronous, just-in-time image data to the printer housing 110 in a number of configurations, including, for example, a configuration with multiple FGPAs at the printer housing 110, each of which may implement the controller 190 and interface with one or more data pumps using one or more cables.

The controller 190 may be, for example, a field-programmable gate array that includes a microprocessor, transceiver, and minimal memory. The controller 190 may be connected to the printer housing 110 such that the controller 190 can be disconnected easily should the printer housing 110 and/or hardware in the printer housing 110 be changed. For example, if the printer housing 110 is replaced with a newer printer housing containing newer printing modules, the controller 190 can be disconnected from the older printer housing 110 and connected to the newer printer housing.

The implementation of the time delay $\Delta t$ in immediate printing (e.g., the implementation of $\Delta t_n$ by the control electronics and the implementation of $\Delta t_i$ by the controller at the printer housing) can be similarly used when the image data is stored at the printer housing for more than one jetting period T. For example, the implementation of $\Delta t_n$ by the remote control electronics as discussed with FIG. 3 can be similarly done without substantial modifications. The image data in a data packet containing the delay $\Delta t_i$ and received at the printer housing is stored in one or more latches. The image data and the delay $\Delta t_i$ are not processed until receipt of new or subsequent data at the printer housing. Once the processing starts, the controller and other devices on the printer housing, such as the switches for the nozzles, can take similar steps as described with respect to FIGS. 4A and 4B.

The printing systems, such as the system 100 of FIG. 1A and the system 1000 of FIG. 3 can be scaled to include more print modules than shown in the figures and can be used with more remote electronics on different remote devices, such as computers. In addition, the data rate of image data sent from the remote control electronics to the printer housing can be scaled. In the example of the system 1000, the control electronics 1060 can be implemented on a personal computer (PC) card that can be connected into a Peripheral Component Interconnect (e.g., a PCI-type interconnection system) in the personal computer. To increase the data delivery rate, multiple PC cards of control electronics 1060 can be used on a personal computer to communicate with one printer housing. Each PC card can be connected into a PCI slot of the computer. For example, two-sided newspaper printing may require 2 Gb/s of image data to be sent to the printer housing to enable just-in-time printing of an image on a workpiece. If the data pump 1070 for one piece of control electronics 1060 is capable of delivering data at a rate of about 1 b/s, then two data pumps 1070 in two control electronics 1060 can be connected in parallel in corresponding PCI slots to deliver at the desired rate of 2 Gb/s. In this example, each PC card of control electronics 1060 can be connected to the printer housing an associated connection (e.g., wirelessly or by a cable). In some implementations, the top and bottom sides of the workpiece can receive one color printed on each side.

A high image data delivery rate can also be achieved by the parallel operation of multiple computers to deliver the image data to the printer housing. In an example of the system 1000, each computer may have at least one PC card of control electronics 1060 connected to the PCI slot of the computer. For example, four parallel computers, each containing two PC cards of control electronics 1060, can offer 8 Gbps aggregate bandwidth, which can be enough to print four colors on each of the two sides of a newspaper in real time. The system 1000 may offer scalable transmission of high bandwidth, synchronous, image data to the print modules in a number of configurations, including adding multiple FGPAs to the print modules. Because the system 1000 can handle high bandwidths of image data, the system 1000 can provide just-in-time printing of high resolution images at high conveyor speeds, large-size images (e.g., wide and/or long images) at high conveyor speeds, and/or multi-color and grayscale images at high conveyor speeds.

All publications, patent applications, patents, and other references mentioned herein are incorporated by reference herein in their entirety.

Other embodiments are within the scope of the following claims.

What is claimed is:

1. A system for use in fluid jetting, the system comprising:
    a first print module comprising a first row of nozzles;
    a second print module comprising a second row of nozzles; and
    a controller to receive a first data packet from a remote device at a first moment and a second data packet from the remote device at a second moment after the first moment, the first data packet and the second data packet each containing image data for the first print module and the second print module;
    wherein upon receipt of the first data packet, the controller is configured to cause at least some nozzles in the first row, at a third moment, to eject fluid droplets onto a line on a substrate, and upon receipt of the second data packet, the controller is configured to cause at least some nozzles in the second row, at a fourth moment separated from the third moment by a time delay, to eject fluid droplets onto the line on the substrate,
    wherein the time delay comprises a first portion being integer times a length of a jetting cycle and a second portion being a fraction of the length of a jetting cycle, and
    wherein the time difference between the first and second moments equals the first portion of the time delay and the second portion of the time delay is encoded in at least one of the first and second data packets.

2. The system of claim 1, wherein during the fluid ejection, the first and second print modules and the substrate are in a relative motion along a first direction, the time delay being determined based on a speed of the relative motion and a distance between the first and second rows of nozzles along a second direction perpendicular to the first direction.

3. The system of claim 2, further comprising an encoder for determining the speed of the relative motion during the fluid ejection and wherein the time delay dynamically changes as the speed of the relative motion changes during the fluid ejection.

4. The system of claim 2, wherein the first row of nozzles and the second row of nozzles are arranged to form one continuous row of nozzles and the time delay is zero.

5. The system of claim 2, wherein the first row of nozzles and the second row of nozzles are substantially parallel such that the distance is nonzero, and the time delay is nonzero.

6. The system of claim 1, further comprising a first memory associated with the first print module and a second memory associated with the second print module, each memory having a waveform stored for applying to selected nozzles of the first and second print modules to cause the selected nozzles to eject fluid droplets.

7. The system of claim 6, wherein the controller is configured to process the second portion of the time delay by inserting a leading blank in a waveform stored in the second memory for the second print module before applying the stored waveform to the second print module.

8. The system of claim 1, further comprising an interface to receive the first and second data packets serially.

9. A method for use in fluid jetting, the method comprising:
    at a print head assembly comprising a first print module and a second print module, the first print module comprising a first row of nozzles and the second print module comprising a second row of nozzles,
    receiving a first data packet from a remote device at a first moment;
    causing at least some nozzles in the first row to eject droplets onto a line on a substrate at a third moment onto a first line on a substrate;
    receiving a second data packet from the remote device at a second moment after the first moment; and
    causing at least some nozzles in the second row to eject droplets, at a fourth moment separated from the third moment by a time delay, onto the line on the substrate, the time delay comprising a first portion being integer times a length of a jetting cycle and a second portion being a fraction of the length of a jetting cycle, the time difference between the first and second moments being the first portion of the time delay and the second portion of the time delay being encoded into at least one of the first and second data packets.

10. The method of claim 9, wherein the time delay is determined based on a speed of the substrate along a first direction during the fluid jetting and a distance between the first and second row of the nozzles along a second direction perpendicular to the first direction.

11. The method of claim 10, wherein the speed of the substrate is determined based on information from an encoder.

12. The method of claim 11, wherein the time delay is periodically determined during the fluid jetting based on periodical receipt of information about the speed from the encoder.

13. The method of claim 9, wherein causing at least some nozzles in the second row to eject droplets comprises inserting a leading blank representing the second portion of the time delay into a waveform to be applied onto the at least some nozzles in the second row.

14. A system for use in fluid jetting, the system comprising:
control electronics residing on a remote computer, the control electronics configured to generate and deliver data packets for jetting a fluid; and
a print head assembly remote from the computer, the print head assembly comprising
a first print module comprising a first row of nozzles;
a second print module comprising a second row of nozzles;
a controller configured to receive a first data packet from the control electronics at a first moment and a second data packet from the control electronics at a second moment after the first moment, the first data packet and the second data packet each containing image data for the first print module and the second print module;
wherein upon receipt of the first data packet, the controller is configured to cause at least some nozzles in the first row, at a third moment, to eject fluid droplets onto a line on a substrate, and upon receipt of the second data packet, the controller is configured to cause at least some nozzles in the second row, at a fourth moment separated from the third moment by a time delay, to eject fluid droplets onto the line on the substrate,
wherein the time delay comprises a first portion being integer times a length of a jetting cycle and a second portion being a fraction of the length of a jetting cycle, and
wherein the time difference between the deliveries of the first and second data packets from the computer equals the first portion of the time delay and the second portion of the time delay is encoded in t least one of the first and second data packets.

15. The system of claim 14, wherein the control electronics communicates with the print head assembly by one or more cables.

16. The system of claim 15, wherein each cable allows the data packets to be delivered serially from the control electronics to the print head assembly.

17. The system of claim 15, wherein the cables comprise optical cables.

* * * * *

UNITED STATES PATENT AND TRADEMARK OFFICE
CERTIFICATE OF CORRECTION

PATENT NO. : 8,403,447 B1
APPLICATION NO. : 13/231599
DATED : March 26, 2013
INVENTOR(S) : Deane A. Gardner and Yulin Philip Hseuh Page 1 of 1

It is certified that error appears in the above-identified patent and that said Letters Patent is hereby corrected as shown below:

On the Title Page, Item (65), insert --(65) Prior Publication data: US 2013/0063511 A1 3/14/13--;

In the Claims
Column 18, line 21, in claim 14, delete "t" from "in t least" and replace with --at--.

Signed and Sealed this
Fourth Day of June, 2013

Teresa Stanek Rea
*Acting Director of the United States Patent and Trademark Office*